United States Patent
Levich et al.

(10) Patent No.: US 10,099,664 B2
(45) Date of Patent: Oct. 16, 2018

(54) ADJUSTABLE BRAKE APPARATUS FOR USE WITH VEHICLES

(71) Applicant: Ford Global Technologies, LLC, Dearborn, MI (US)

(72) Inventors: Michael Levich, Ferndale, MI (US); Curtis Hargitt, Howell, MI (US); Peter Simeon Lazarevski, Dearborn, MI (US); Christopher Melgar, Birmingham, MI (US); Greg David Folta, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/447,870

(22) Filed: Mar. 2, 2017

(65) Prior Publication Data

US 2018/0251104 A1 Sep. 6, 2018

(51) Int. Cl.
*G05G 1/04* (2006.01)
*B60T 7/10* (2006.01)

(52) U.S. Cl.
CPC ............... *B60T 7/104* (2013.01); *G05G 1/04* (2013.01); *B60T 2220/02* (2013.01); *B60Y 2400/30* (2013.01)

(58) Field of Classification Search
CPC ... B60T 7/08; B60T 7/085; B60T 7/10; B60T 7/102; B60T 7/104; B60T 7/105; B60T 2220/02; B60T 2220/04; G05G 1/04; G05G 1/06; B60Y 2400/30; B60Y 2400/301; F16H 59/0278
See application file for complete search history.

(56) References Cited

U.S. PATENT DOCUMENTS

| | | | | |
|---|---|---|---|---|
| 1,743,241 A | * | 1/1930 | Schmidt | B60K 20/02 403/102 |
| 3,464,288 A | * | 9/1969 | Sheridan | B60Q 1/425 74/525 |
| 4,825,734 A | | 5/1989 | Schwalbe et al. | |
| 5,269,045 A | * | 12/1993 | Deserio | B25D 17/043 16/422 |
| 6,029,535 A | * | 2/2000 | Kenny | F16H 59/0278 403/349 |

(Continued)

FOREIGN PATENT DOCUMENTS

DE 202011103929 U1 * 10/2011 ............. B25G 1/06
DE 202014103741 U1 * 9/2014 ............. B62K 23/06

(Continued)

OTHER PUBLICATIONS

Machine translation of JP 04283132 A obtained on Feb. 7, 2018.*

*Primary Examiner* — Adam D Rogers
(74) *Attorney, Agent, or Firm* — Frank MacKenzie; Hanley, Flight & Zimmerman, LLC

(57) ABSTRACT

Adjustable brake apparatus for use with vehicles are disclosed herein. An example apparatus includes a brake lever to control braking of a vehicle and a handle coupled to the brake lever. The handle rotates relative to the brake lever between a first position and a second position. The handle locks in the first position and the second position to enable actuation of the brake lever by a force applied to the handle in either the first position or the second position.

18 Claims, 10 Drawing Sheets

(56) References Cited

U.S. PATENT DOCUMENTS

| | | | |
|---|---|---|---|
| 7,000,497 B1 * | 2/2006 | Campbell | F16H 59/0278 74/525 |
| 7,721,622 B2 * | 5/2010 | Wen | B62K 23/06 74/523 |
| 8,677,851 B2 * | 3/2014 | Vermeersch | B60K 20/06 74/473.31 |
| 8,720,303 B2 * | 5/2014 | Wu | B62L 3/02 74/523 |
| 2005/0087415 A1 | 4/2005 | Gorga et al. | |
| 2010/0050807 A1 * | 3/2010 | Tsai | B62K 23/06 74/502.2 |
| 2010/0056331 A1 * | 3/2010 | Johansson | B60K 20/04 477/92 |
| 2012/0006146 A1 * | 1/2012 | Warren | G05G 1/04 74/524 |
| 2012/0160053 A1 * | 6/2012 | Hon | G05G 1/04 74/522 |
| 2013/0008280 A1 * | 1/2013 | Hsu | B60T 7/102 74/522 |

FOREIGN PATENT DOCUMENTS

| | | |
|---|---|---|
| EP | 0466534 | 1/1992 |
| JP | S57191153 | 11/1982 |
| JP | H01141154 | 6/1989 |
| JP | 04283132 A * | 10/1992 |
| JP | 2014184796 | 10/2014 |
| KR | 20010087455 | 9/2001 |

* cited by examiner

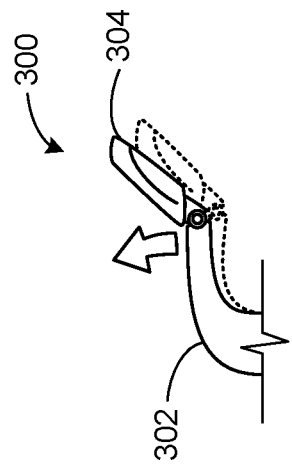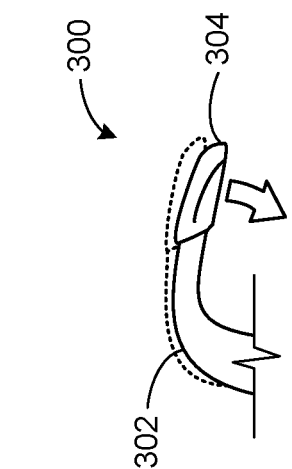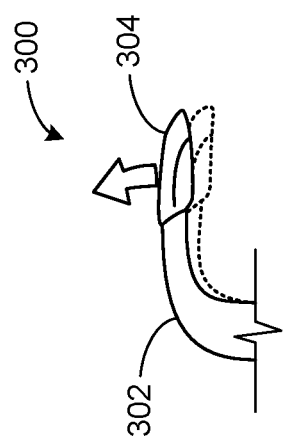

ADJUSTABLE BRAKE APPARATUS FOR USE WITH VEHICLES

FIELD OF THE DISCLOSURE

This disclosure relates generally to vehicle systems and, more particularly, to adjustable brake apparatus for use with vehicles.

BACKGROUND

Vehicles often have hand operated parking brake levers to provide braking control to drivers in addition or as an alternative to foot operated brake pedals. These parking brake levers may be operatively coupled to wheel assemblies of the vehicles (e.g., via a cable or wire) to facilitate braking forces transmitted to the wheel assemblies. Some parking brake levers may utilize sensors, switches, and/or motors (e.g., electric parking brake systems) to facilitate braking forces transmitted to the wheel assemblies. Generally, drivers can periodically operate or actuate the brake levers to provide braking forces to the wheel assemblies to improve control of the vehicles during maneuvers (e.g., drifting) or while the vehicles are parked. In recent years, controllers or processing architectures have enhanced vehicle performance by automatically controlling different systems (e.g., braking systems, steering systems, etc.) to assist drivers or enable them to perform maneuvers that would have otherwise been beyond their abilities.

SUMMARY

An example apparatus disclosed herein includes a brake lever to control braking of a vehicle and a handle coupled to the brake lever. The handle rotates relative to the brake lever between a first position and a second position. The handle locks in the first position and the second position to enable actuation of the brake lever by a force applied to the handle in either the first position or the second position.

Another example apparatus disclosed herein includes a brake lever of a vehicle pivotable between an engaged position and a disengaged position. A handle is coupled to the brake lever via a hinge disposed on an end of the brake lever. The handle pivots relative to the hinge between a first position and a second position. The handle locks in the first position and the second position to receive an actuation force. The brake lever pivots between the disengaged position and the engaged position in response to the actuation force.

Another example apparatus disclosed herein includes a brake lever operatively coupled to a vehicle and a handle coupled to the brake lever. The handle rotates to different positions relative to the brake lever and a vertical axis. The handle receives an actuation force to enable actuation of the brake lever when in the different positions. The apparatus includes means for locking the handle in the different positions.

BRIEF DESCRIPTION OF THE DRAWINGS

FIGS. 3A, 3B and 3C illustrate other positions of another example brake apparatus of FIG. 1.

Figure 1:
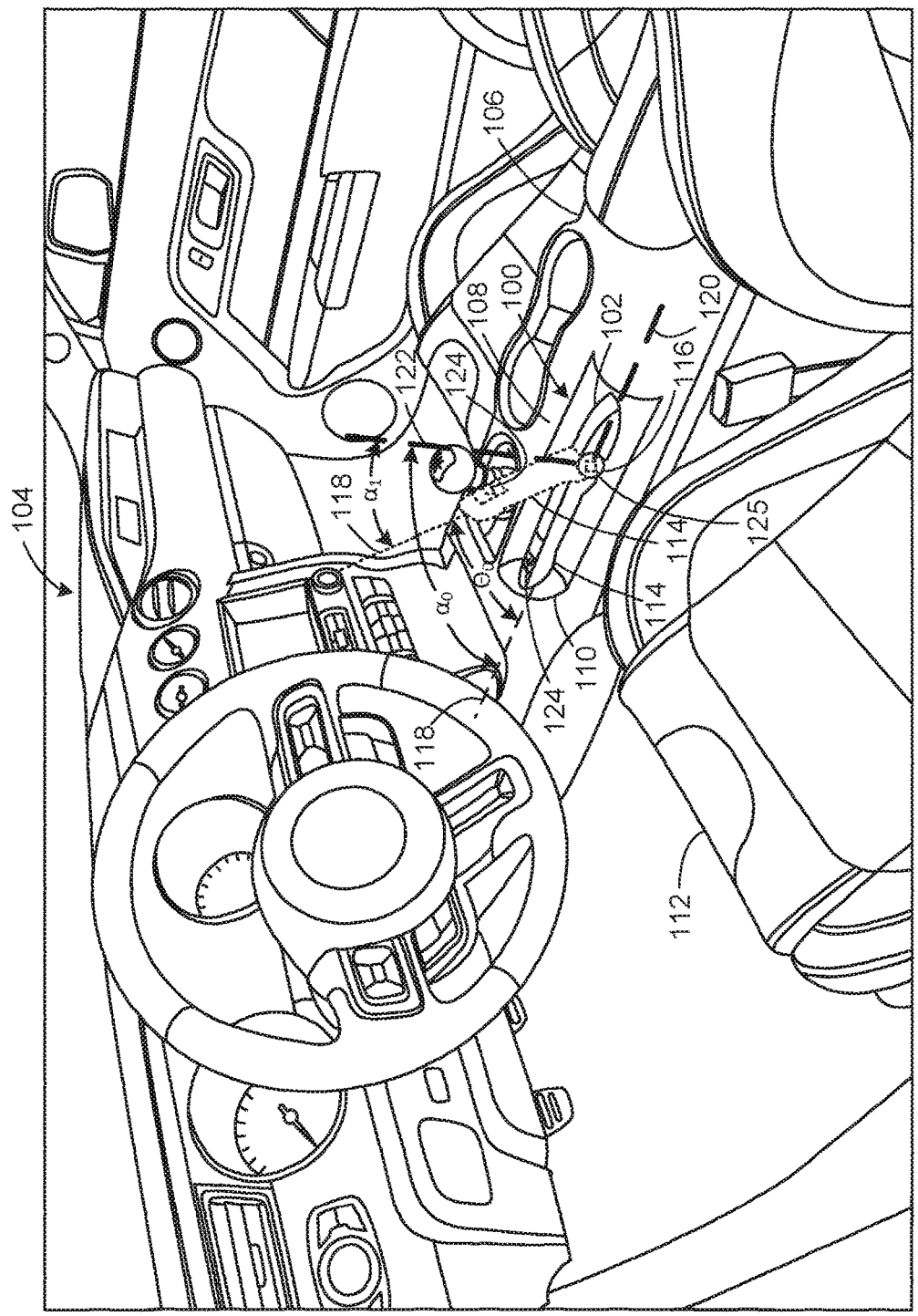
FIG. 1 is a schematic illustration of an example brake apparatus and an example vehicle to implement the examples disclosed herein in accordance with the teachings of this disclosure.

The figures disclosed herein are not to scale. Wherever possible, the same reference numbers will be used throughout the drawings and accompanying written descriptions to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Vehicles typically have hand operated emergency or parking brake levers disposed adjacent to drivers to provide braking control to the drivers in addition or alternatively to brake pedals. For example, a driver parking a vehicle on an inclined surface may operate or actuate the parking brake lever to ensure the vehicle does not inadvertently move while parked. These parking brake levers may be mechanically coupled (e.g., manual parking brake systems) to wheel assemblies of the vehicles or electromechanically coupled (e.g., electric parking brake systems) to facilitate the transmission of braking forces to the wheel assemblies and, more generally, to control braking of the vehicles. During certain vehicle operations or maneuvers (e.g., racing, drifting, etc.), drivers may periodically operate or actuate the brake levers to offset torque or braking forces transmitted to the wheel assemblies, control yaw rates of the vehicles, and/or, more generally, improve or optimize control of the vehicles during such operations or maneuvers. Typically, a handle is fixedly coupled to the parking brake lever to provide a fixed orientation (e.g., vertical, horizontal, etc.) desired by the driver. For example, the driver may desire the handle to have a substantially fixed vertical orientation to improve leverage and control during the above-described operations or maneuvers. Often, the driver may desire to change or adjust the orientation of the handle (e.g., to a substantially fixed horizontal orientation) during a time they do not need or require the parking brake lever.

Examples disclosed herein provide an adjustable brake apparatus having a handle operatively coupled to a brake lever of a vehicle. Examples disclosed herein enable the handle to rotate and/or pivot between different positions relative to the brake lever to adjust and/or control leverage of the handle during use by a driver. In some disclosed examples, the handle locks in a first position that is substantially horizontal and adjacent to the driver of the vehicle. When in the first locked position, the handle may extend below a center console of the vehicle to be relatively unobtrusive and provide space adjacent to the driver during a time when the driver may not require immediate use of the brake lever. In some disclosed examples, the handle can rotate and/or pivot to a second locked position that extends above the console and substantially vertical or angled relative to the brake lever to improve leverage and/or to facilitate access to the handle for easier and/or quicker actuation of the brake lever.

Some disclosed examples provide a first portion of the handle coupled to the brake lever and a second portion of the handle coupled to the first portion. In such examples, the second portion can move relative to the first portion to lock and/or unlock the handle. In some such examples, a lock operatively coupled to the handle and the brake lever enables the handle to lock and/or unlock when in the different positions. After the handle locks in one of the one or more locked positions, a force can be applied or transmitted to the handle to actuate the brake lever and provide braking to the vehicle.

Additionally or alternatively, examples disclosed herein detect or determine user selections relating to different driving modes of the vehicle (e.g., a drift mode and/or a traditional parking brake mode). In some disclosed examples, the driver may select a first driving mode or a second driving mode of the vehicle while driving by contacting a sensor or switch disposed on the handle and accessible by the driver. In other disclosed examples, the driver may select the first driving mode or the second driving mode via rotating or pivoting the handle to the different positions. In such examples, a sensor (e.g., a rotational position or angle sensor) may be operatively coupled to the brake lever and/or handle to detect or determine the different rotational positions of the handle.

FIG. 1 is a schematic illustration of an example brake apparatus 100 in accordance with the teachings of this disclosure. The example brake apparatus 100 includes a brake lever (e.g., an emergency or parking brake lever) 102 operatively coupled to an automobile or a vehicle 104 to provide, facilitate and/or control braking of the vehicle 104. In the illustrated example of FIG. 1, the vehicle 104 can be a car, a truck, a van, etc. operated by a driver (e.g., a person). Wheel assemblies (e.g., front and/or rear wheel assemblies) (not shown) of the vehicle 104 generate braking forces to decelerate the vehicle 104 in response to actuation or engagement of the brake lever 102. In the illustrated example of FIG. 1, the vehicle 104 includes a console (e.g., an arm rest, a transmission tunnel, a storage compartment, etc.) 106 having an upper surface 108 and defining a recess 110 adjacent to a seat 112 (e.g., a sport seat, a bench seat, etc.) of the vehicle 104. The brake lever 102 may be positioned adjacent to either or both of the surface 108 and/or of the seat 112. In this example, the brake lever 102 is disposed in the recess 110 of the console 106. While FIG. 1 describes a position of the brake lever 102 within the vehicle 104 relative to the console 106 and/or the seat 112, examples disclosed herein can be implemented by using other known positions of the brake lever 102 and/or other configurations relating to an interior of the vehicle 104.

The example brake apparatus 100 includes a handle 114 coupled to the brake lever 102. The handle 114 may include an integral piece or structure and/or may have various pieces, structures, and/or configurations, which is explained in greater detail below in connection with FIGS. 2A, 2B, 2C, 2D, 2E, 2F, 2G, 2H, 3A, 3B and 3C. In this example, the handle 114 has a shape that is generally oblong and/or sized to enable the driver of the vehicle 104 to grip and/or apply a force to the handle 114. The handle 114 extends axially in a direction from the brake lever 102 and/or a hinge 116 coupled to the brake lever 102 to provide an elongate axis 118. In this example, the hinge 116 is disposed on a distal end of the brake lever 102 and coupled to the handle 114 to enable the handle 114 to rotate and/or pivot relative to the hinge 116, the brake lever 102, a horizontal axis 120 and/or a vertical axis 122 to different positions (as represented by the dotted/dashed lines). In other examples, any suitable type of rotatable and/or pivotable coupling mechanism (e.g., pins, joints, bearings, etc.) and/or coupling technique (e.g., snap-fitting) can be used to enable the handle 114 to rotate and/or pivot.

As the handle 114 rotates and/or pivots to the different positions, the handle 114 and/or the elongate axis 118 provide different angles relative to the horizontal axis 120 and/or the vertical axis 122 (represented by $\alpha_0$ and $\alpha_1$) when in the different positions. In other examples, the handle 114 and/or elongate axis 118 provide different rotation angles (represented by $\theta_0$) defined by the handle 114 rotating and/or pivoting between the different positions. In this example, the handle 114 can rotate and/or pivot between a first position (as represented by the solid lines in FIG. 1) and a second position (as represented by the dotted/dashed lines in FIG. 1). When in the first position, the handle 114 may extend forward (relative to the vehicle 104) and/or upward (in the orientation of FIG. 1) to position the elongate axis 118 within 45 degrees (or $\pi/4$ radians) relative to the horizontal axis 120 and/or, in other words, to provide a first angle $\alpha_0$ of the handle 114 where $45° \leq \alpha_0 \leq 90°$. In other examples, the handle 114 can extend below the horizontal axis 120 (e.g., in the absence of the console 106) when in the first position (i.e., $\alpha_0 > 90°$). In the illustrated example of FIG. 1, the handle 114 extends below and/or is approximately level with the surface 108 of the console 106 when in the first position. Additionally or alternatively, the handle 114 extends substantially horizontally away from the end of the brake lever 102 when in the first position. As used herein, the term "substantially horizontally" and/or "substantially horizontal" are defined as a position of the handle 114 and/or the elongate axis 118 to provide an angle relative to the horizontal axis 120 within +/−15°.

In the illustrated example of FIG. 1, when in the second position (as represented by the dotted/dashed lines), the handle 114 extends upward (in the orientation of FIG. 1) above the brake lever 102 and/or the surface 108 of the console 106 to provide a second angle (represented by $\alpha_1$) relative to the vertical axis 122. In this example, the second angle has a value of 45 degrees relative to the vertical axis 122 (i.e., $\alpha_1 = 45°$). Additionally or alternatively, the handle 114 extends above and/or outside of the recess 110 of the console 106 when in the second position. In this example, the handle 114 and/or the elongate axis 118 rotate and/or pivot between the first position and the second position to provide a rotation angle having a value of 45 degrees (i.e., $\theta_0 =$) 45°. In other examples, the handle 114 rotates and/or pivots between other positions (e.g., $\alpha_0 = 110°, 80°, 50°$, etc. and/or $\alpha_1 = 70°, 40°, 10°$, etc.) to provide other rotation angles spanning less than 45 degrees (i.e., $\theta_0 < 45°$) and/or greater than 45 degrees (i.e., $\theta_0 > 45$). Additionally or alternatively, while a first position and a second position of the handle 114 are illustrated in FIG. 1, the handle 114 can provide other positions such as a third position, a fourth position, etc.

In the illustrated example of FIG. 1, the handle 114 rotatably and/or pivotably locks at the hinge 116 in the above-described different positions (e.g., the first position, the second position, etc.). When the handle 114 is locked in the different positions, an actuation force can be applied and/or transmitted to the handle 114 (e.g., by the driver) to actuate or engage the brake lever 102 and cause the brake lever 102 to move from a disengaged position (as illustrated in FIG. 1) when no braking force is applied to the wheel assemblies of the vehicle 104 to an engaged position when a braking force is applied to the wheel assemblies. A magnitude of the braking force or deceleration provided to the vehicle 104 may be based on the actuation force and/or movement of the brake lever 102. For example, as a magnitude of the actuation force increases, the magnitude of the braking forces or deceleration provided by the brake lever 102 may increase. In some such examples, the wheel assemblies of the vehicle 104 can slip relative to a road surface (e.g., while racing, drifting, etc.) and/or lock-up (e.g., while parking) in response to the braking forces. In the illustrated example of FIG. 1, the brake lever 102 is in a disengaged position. The handle 114 and the brake lever 102 are below the surface 108 of the console 106 when the handle 114 is in the first position and the brake lever 102 is in the disengaged position. In some examples, the handle 114 extends above the surface 108 while the brake lever 102 is below the surface 108 when the handle 114 is in the second position and the brake lever 102 is in the disengaged position.

The example brake apparatus 100 includes means for locking the handle 114 in the above-described different positions. In some examples, the means for locking the handle 114 includes a lock (not shown) adjacent to and/or operatively coupled to the hinge 116, the handle 114 and/or the brake lever 102, which is explained in greater detail below in connection with FIGS. 2G and 2H. In such examples, the driver of the vehicle 102 can operate the lock to rotatably and/or pivotably lock the handle 114 in the different positions via manipulation or input applied to the lock. In other examples, other locking apparatus and/or locking techniques may be advantageously used to enable the handle 114 to rotatably and/or pivotably lock relative to the brake lever 102. For example, position hinges and/or torque hinges may be advantageously used. In the illustrated example of FIG. 1, a switch or button 124 can be disposed on the handle 114 and/or the brake lever 102 and operable by the driver or an occupant of the vehicle 104. In some examples, the switch or button 124 can protrude from a surface of the handle 114 to receive contact or user input. The switch or button 124 can be mechanically coupled to the means for locking to prevent and/or limit relative rotational movement in response to contact or user input. In other examples, the switch or button 124 may be electromechanically coupled to the lock to limit and/or prevent relative rotational movement via an actuator, servo, motor, etc. in response to contact or user input to the switch or button 124.

Additionally or alternatively, the switch or button 124 provides user selections relating to different driving modes of the vehicle 104. For example, a processor or controller (e.g., an electronic control unit (ECU), an electronic braking system (EBS), etc.) communicatively coupled to the vehicle 104 enhances or alters performance of the vehicle 104 when in the different driving modes. In some such examples, a first driving mode may be associated with a first characteristic relating to performance of the vehicle 104. For example, when in the first driving mode (e.g., a standard mode), an ECU may adjust driving settings of the vehicle 102 to automatically change gears at relatively low engine speeds (e.g., less than 2,000 revolutions per minute (RPM)), which may be comfortable to the driver. In other examples, a second driving mode may be associated with a second characteristic, different from the first characteristic, relating to performance of the vehicle 104. For example, when in the second driving mode (e.g., a sport mode), the ECU may further adjust the driving settings of the vehicle 102 to automatically change gears at relatively high engine speeds (e.g., greater than 3,000 RPM)), which may be desired by the driver during certain operations or maneuvers such as racing, drifting, etc. In the illustrated example of FIG. 1, the first position of the handle 114 is associated with the first driving mode and the second position is associated with the second driving mode.

The example brake apparatus 100 includes means for detecting and/or determining a user selection of one or more of the above-described driving modes of the vehicle 104. The means for detecting and/or determining is communicatively coupled to the vehicle 104 and/or the processor or controller of the vehicle 104 to provide data indicating one or more of the different driving modes of the vehicle 104. In some examples, the means for detecting and/or determining includes the above-described switch or button 124. For example, the switch or button 124 can respond to direct contact or user input by transmitting a signal or data to the processor or controller of the vehicle 104. In such examples, the driver of the vehicle 104 may contact the switch or button 124 to select one or more of the different driving modes of the vehicle 104 and the switch or button 124 may transmit corresponding data (e.g., that indicates the selection and/or the driving mode) in response. In another example, the means for detecting and/or determining includes a sensor (e.g., a rotational position or angle sensor, a pressure sensor, etc.) 125 operatively coupled to the brake lever 102, the handle 114, and/or the hinge 116. The sensor 125 can detect and/or determine the above described different positions of the handle 114 and/or rotations of the handle 114. In such examples, the sensor 125 provides a user selection of the first driving mode and/or the second driving mode of the vehicle 104 based on certain rotational positions of the handle 114 (e.g., values of $\alpha_0$ and/or $\alpha_1$) and/or rotation angles (e.g., values of $\theta_0$) of the handle 114. For example, the sensor 125 detects and/or determines when the handle 114 is in the first position and/or the second position and transmits data to the vehicle 104 corresponding to the first position and/or the second position respectively.

Figure 2A:
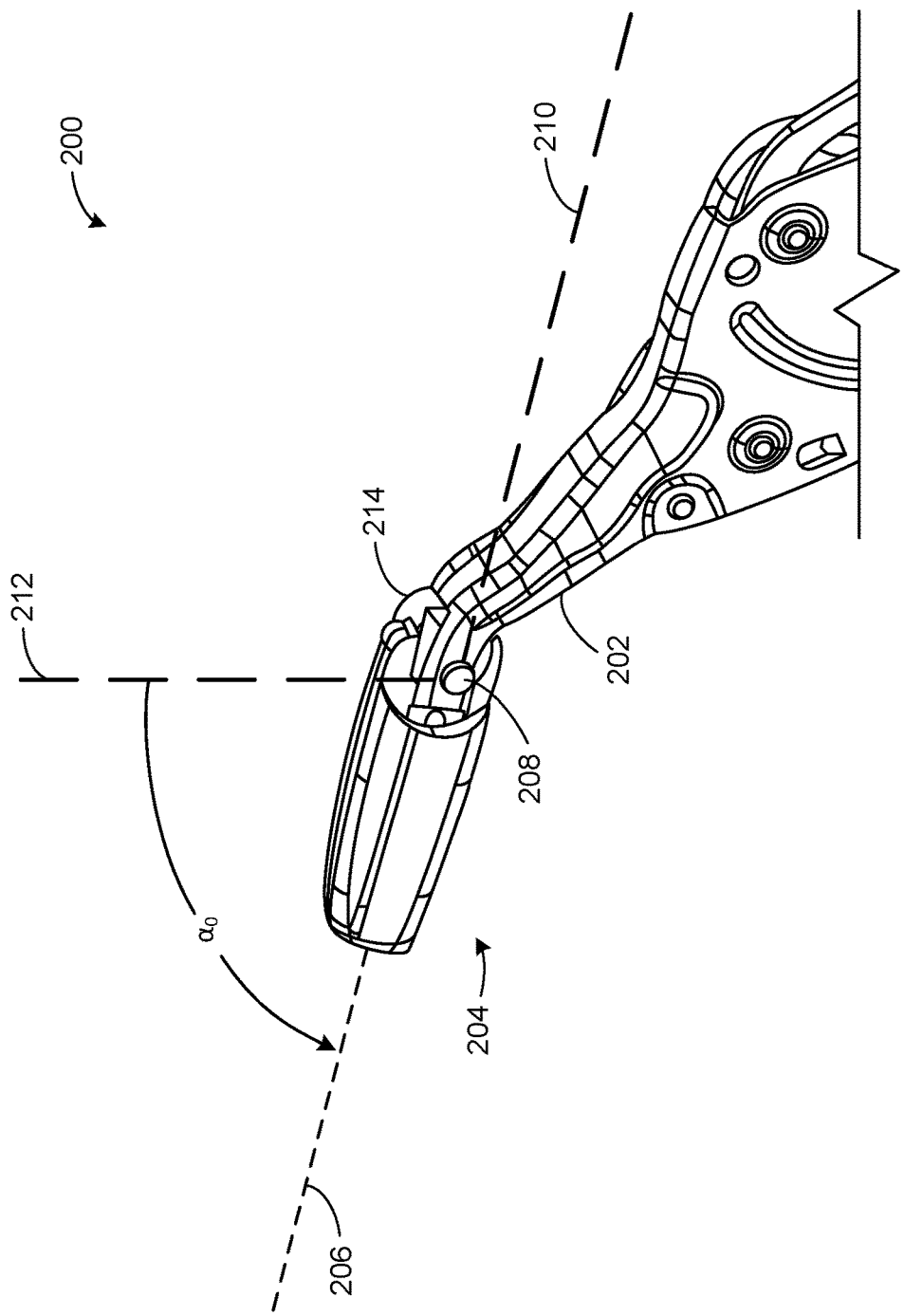
FIGS. 2A, 2B, 2C, 2D, 2E and 2F illustrate different positions of the example brake apparatus of FIG. 1.
Figure 2B:
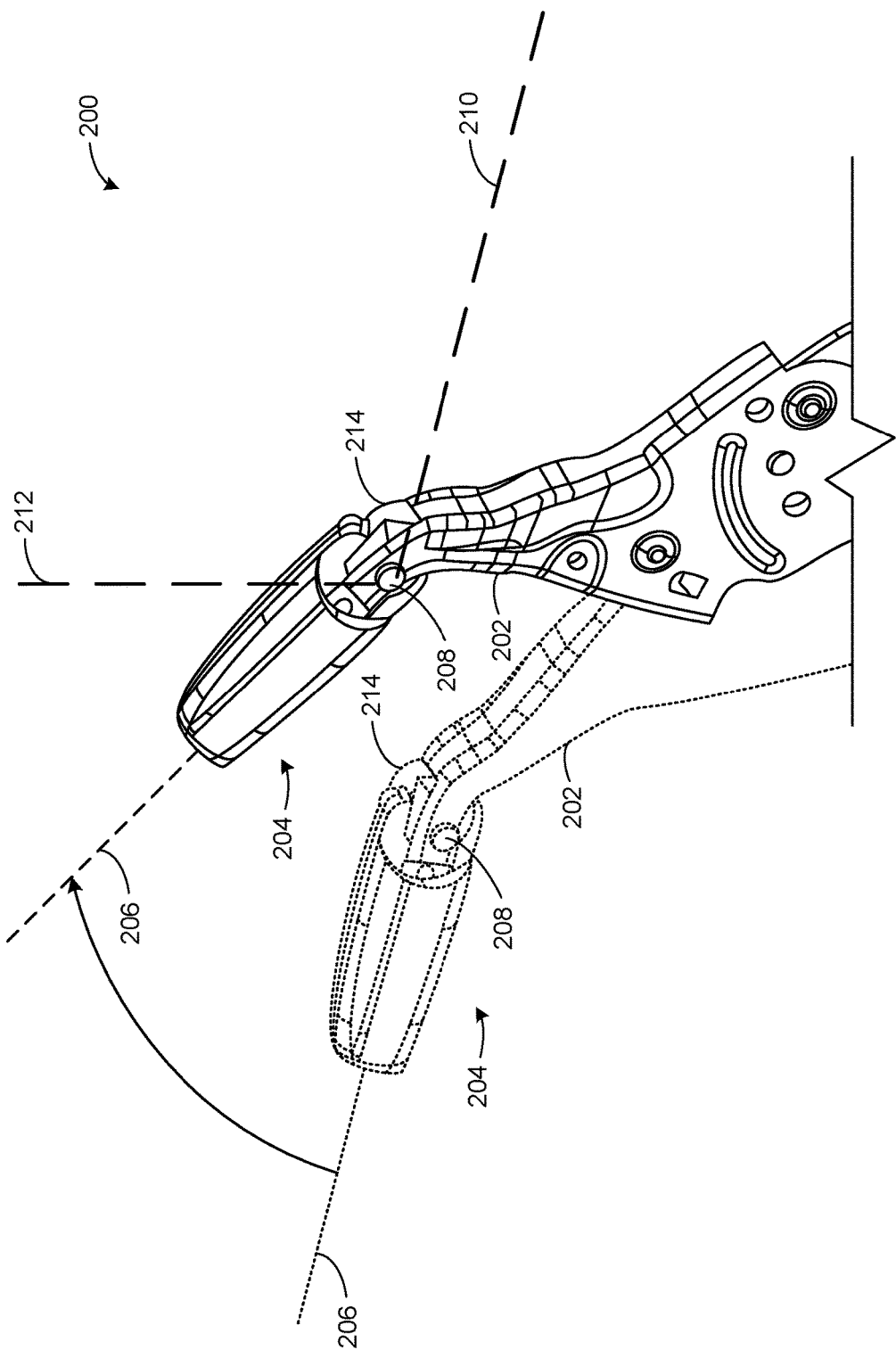

FIGS. 2A, 2B, 2C, 2D, 2E and 2F illustrate different positions of an example brake apparatus 200 that may be used to implement the brake apparatus 100 of FIG. 1 in accordance with the teachings of this disclosure. The example brake apparatus 200 includes a brake lever 202 operatively coupled to a vehicle (e.g., the vehicle 104) to control braking. The example apparatus 200 includes a handle 204 operatively coupled to a distal end of the brake lever 202. The handle 204 extends axially away from the distal end of the brake lever 202 to provide an elongate axis 206. In this example, a hinge 208 is interposed between the brake lever 202 and the handle 204 to enable the handle 204 to rotate and/or pivot to different positions relative to the hinge 208, the brake lever 202, a horizontal axis 210 and/or a vertical axis 212. Additionally or alternatively, as mentioned above, any suitable type of rotatable and/or pivotable coupling mechanism (e.g., joints, pins, bearings and shafts, rivets, etc.) and/or coupling technique (e.g., snap-fitting, riveting, etc.) can be used to enable the handle 204 to rotate and/or pivot to the different positions. When the handle 204 is in a first position, as represented by FIGS. 2A and 2B, the handle 204 is rotatably and/or pivotably locked to provide an initial or a first angle relative to the vertical axis 212 (represented by $\alpha_0$) and/or the horizontal axis 210. In some such examples, the brake apparatus 200 may include a lock 214 adjacent to and/or operatively coupled to the hinge 208, the brake lever 202 and/or the handle 204 to lock the handle 204 in the first position (or other positions) in response to user inputs and/or manipulation of the handle 204 and/or the lock 214, which is explained in greater detail below in connection with FIGS. 2G and 2H.

In the illustrated example of FIG. 2A, the handle 204 extends substantially horizontally (i.e., 75°≤α₀≤105°) away from the end of the brake lever 202 when in the first position and the brake lever 202 is in a disengaged position. In other examples, when in the first position, the handle 204 may extend away from the end of the brake lever 202 to position the elongate axis 206 within 45 degrees relative to the horizontal axis 210 (i.e., 45°≤α₀≤135°). In any case, when in the first position, the handle 204 can receive an actuation force (e.g., via a driver) to engage the brake lever 202. In response to the actuation force, as illustrated in FIG. 2B, the brake lever 202 moves from a disengaged position (represented by the dotted/dashed lines) to an engaged position to provide braking to the vehicle.

Figure 2C:
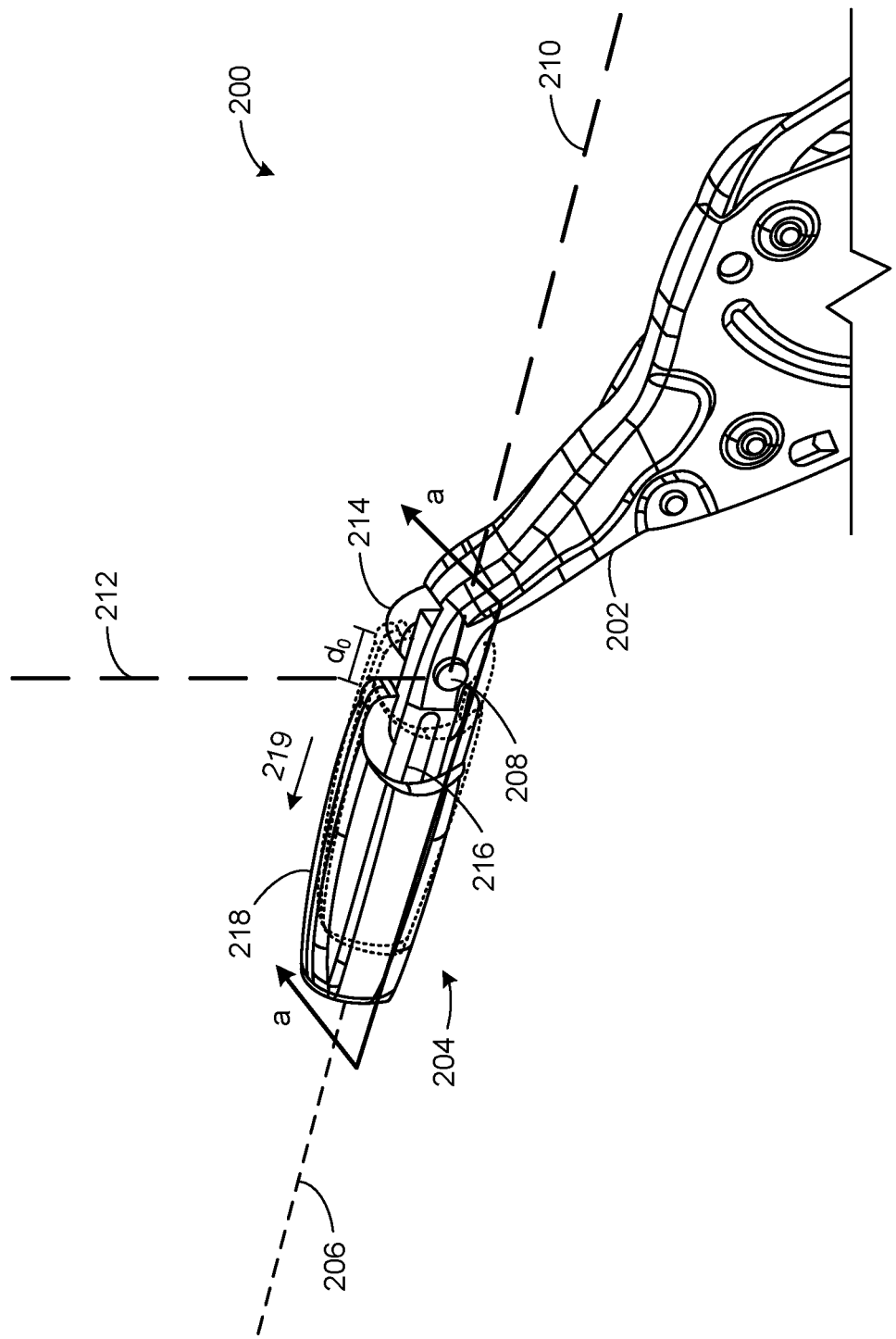

Additionally or alternatively, in some examples, as illustrated in FIG. 2C, the handle 204 includes a first portion 216 coupled to the distal end of the brake lever 202 (at the hinge 208) and a second portion 218 coupled to the first portion 216. In this example, the second portion 218 of the handle 204 moves relative to the first portion 216 in a first direction 219 (e.g., along the elongate axis 206 of the handle 204) away from the brake lever 202 from a locked state (represented by the dotted/dashed lines) to an unlocked state. In such examples, the lock 214 rotatably and/or pivotably unlocks the handle 204 when the second portion 218 moves a distance (represented by $d_0$) relative to the first portion 216 in the first direction. The second portion 218 may travel a certain distance $d_0$ (e.g., 0.5 inches, 1 inch, etc.) before the lock 214 unlocks the handle 204. In such examples, the second portion 218 may engage the first portion 216 to limit the rotational or pivotal movement of the second portion 218 (e.g., when within or at the distance $d_0$) and/or to define the unlocked state and the locked state.

Figure 2D:
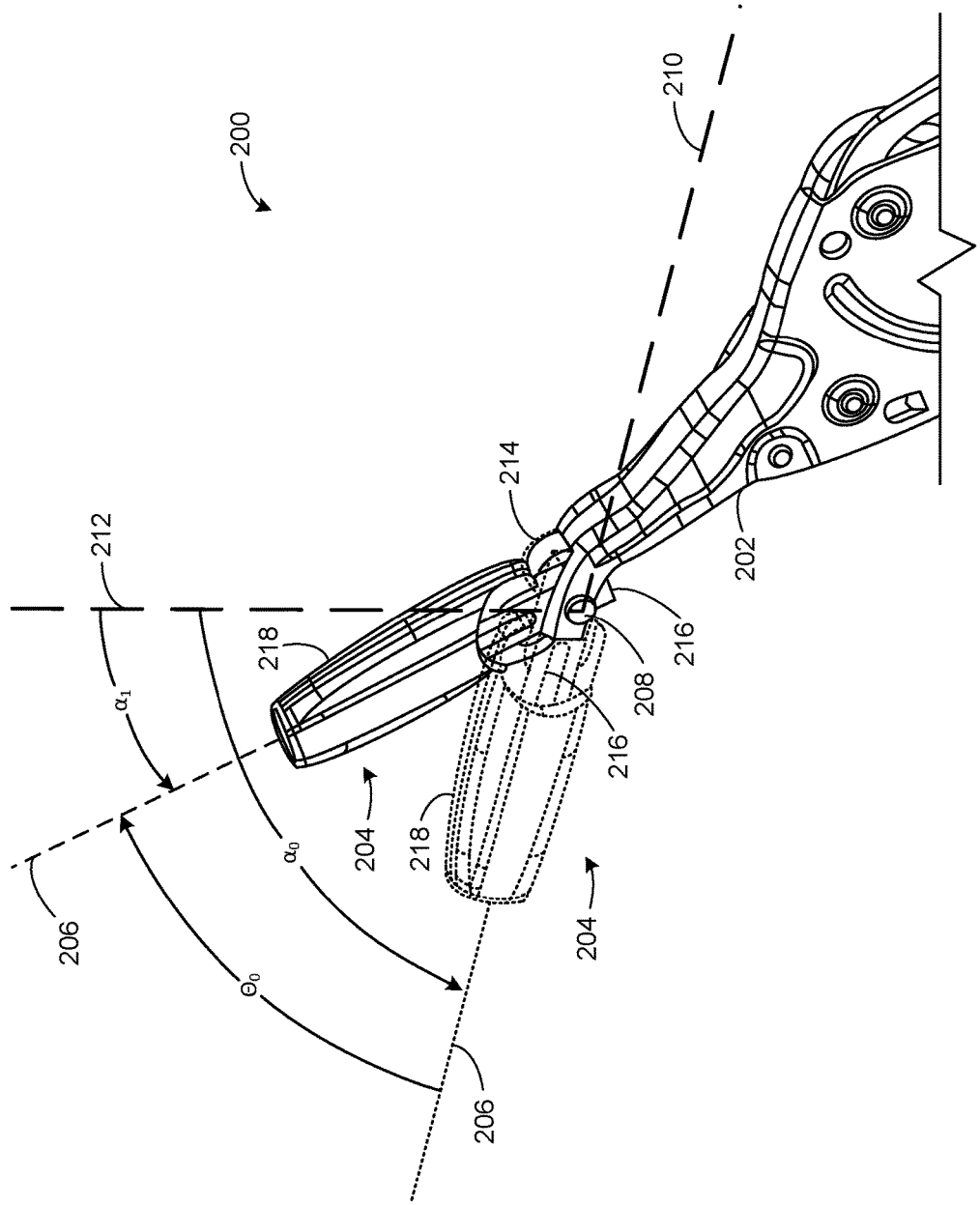

After the second portion 218 moves relative to the first portion 216 in the first direction 219 from the locked state to the unlocked state and/or the lock 214 unlocks the handle 204, as illustrated in FIG. 2D, the handle 204 can rotate and/or pivot relative to the hinge 208, the brake lever 202, the vertical position 212, and/or the horizontal position 210 from the first position (represented by the dotted/dashed lines) to a second position. When in the second position, the handle 204 and/or the elongate axis 206 provide a second angle (represented by $α_1$) relative to the vertical axis 212. Additionally or alternatively, the handle 204 and/or the elongate axis 206 provide an initial or a first rotation angle (represented by $θ_0$) defined by the handle 114 rotating and/or pivoting from the first position to the second position. In this example, the handle 204 and/or the elongate axis 206 rotate and/or pivot from the first position to the second position to provide a rotation angle having a value of 45 degrees (i.e., $θ_0=45°$). In other examples, the handle 114 rotates and/or pivots between other positions to provide other rotation angles having values less than 45 degrees (i.e., $θ_0<45°$) and/or greater than 45 degrees (i.e., $θ_0>45°$). In this example, the handle 204 extends upward (in the orientation of FIG. 2D) and above the brake lever 202 when in the second position and when the brake lever 202 is in the disengaged position. In this example, the handle 204 and/or the elongate axis 206 are positioned 45 degrees relative to the vertical position 212 (i.e., $α_1=45°$) when in the second position and when the brake lever 202 is in the disengaged position. In other examples, the handle 204 and/or the elongate axis 206 can provide other angles relative to the vertical axis 212 (e.g., $α_1=60°$, 30°, 15°, 0°, etc.) when in the second position.

Figure 2E:
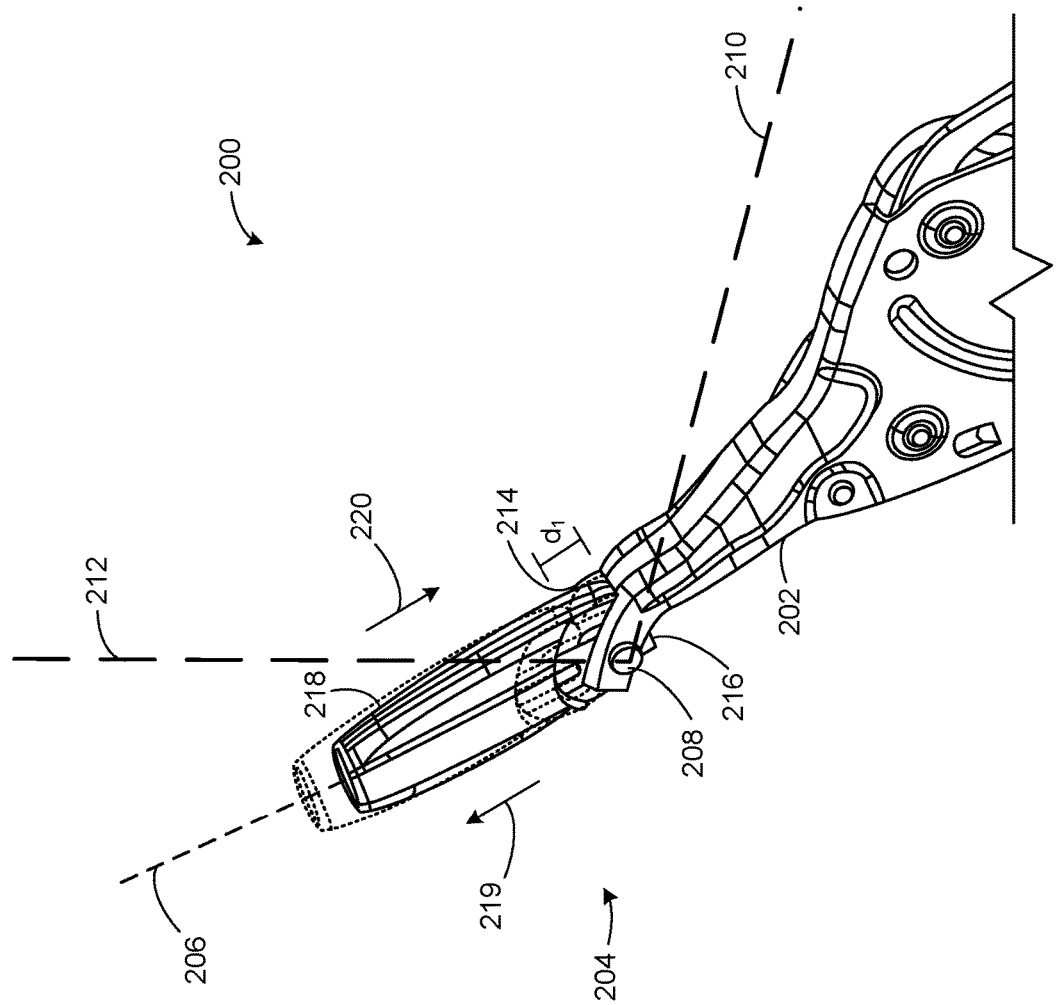
Figure 2F:
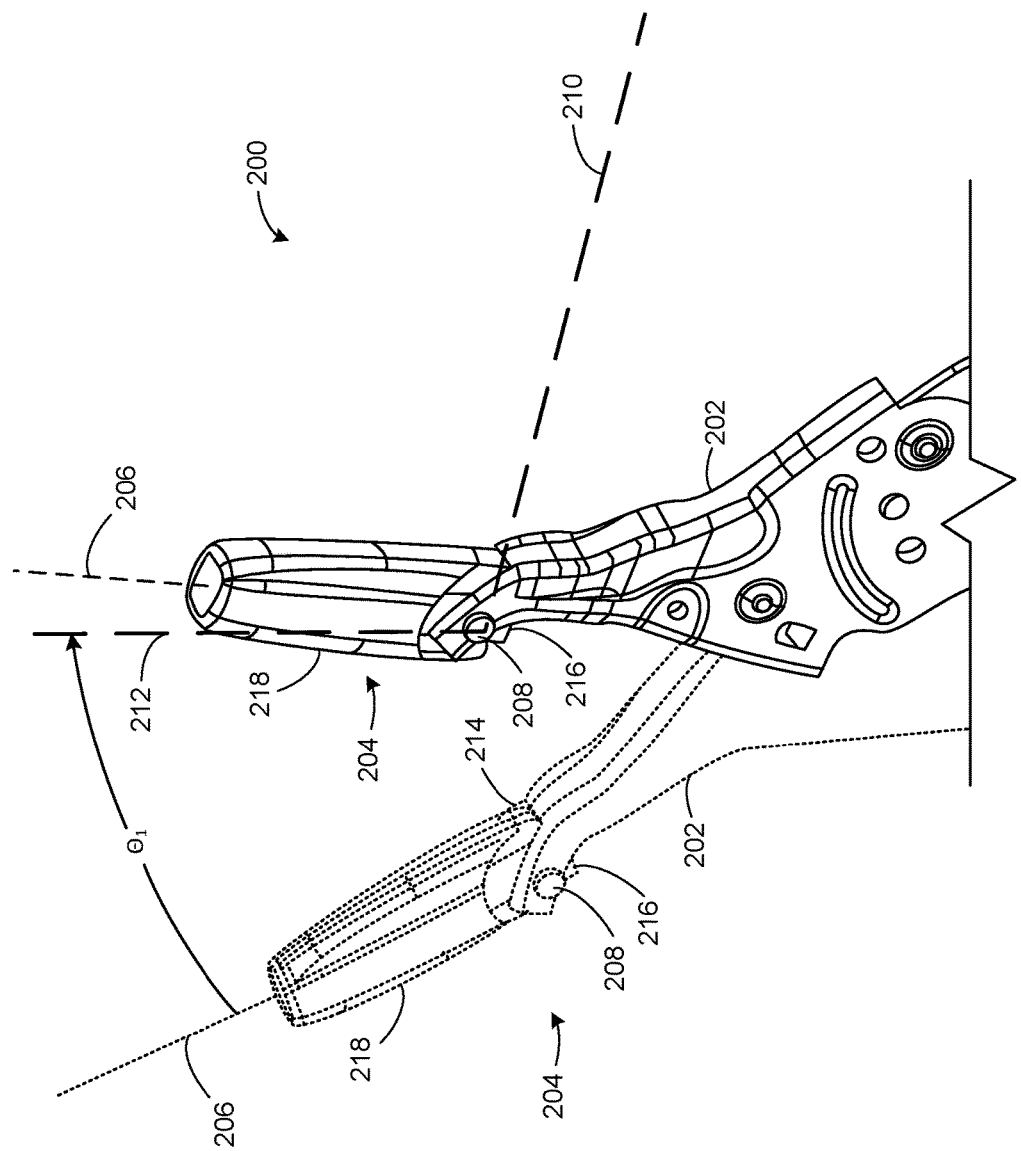

As illustrated in FIG. 2E, the second portion 218 of the handle 204 moves relative to the first portion 216 in a second direction 220, opposite the first direction 219, towards the brake lever 202 along the elongate axis 206 to rotatably and/or pivotably lock the handle 204 when in the second position. In such examples, the second portion 218 may move a distance (represented by $d_1$) relative to the first portion 216 in the second direction before enabling the handle 204 to lock in the second position. For example, the second portion 218 may travel a certain distance $d_1$ (e.g., 0.5 inches, 1 inch, etc.) before the lock 214 engages the handle 204, brake lever 202 and/or the hinge 208 to limit or prevent the handle 204 from rotating and/or pivoting. After the second portion 218 moves in the second direction 220 from the unlocked state to the locked state and/or the lock 214 locks the handle 206, as illustrated in FIG. 2F, the handle 204 can receive an actuation force to enable the brake lever 202 to move from the disengaged position (represented by the dotted/dashed lines) to the engaged position. In some examples, when the brake lever 202 is in the engaged position, the handle 204 extends above the brake lever 202 when in the second position of the handle 204. In this example, the handle 204 and/or elongate axis 206 extends substantially vertically away from the brake lever 202 when in the second position and/or when the brake lever 202 is in the engaged position. As used herein, the term "substantially vertically" and/or "substantially vertical" are defined as a position of the handle 204 and/or the elongate axis 118 that is within +/−15° relative to the vertical axis 120.

Figure 2G:
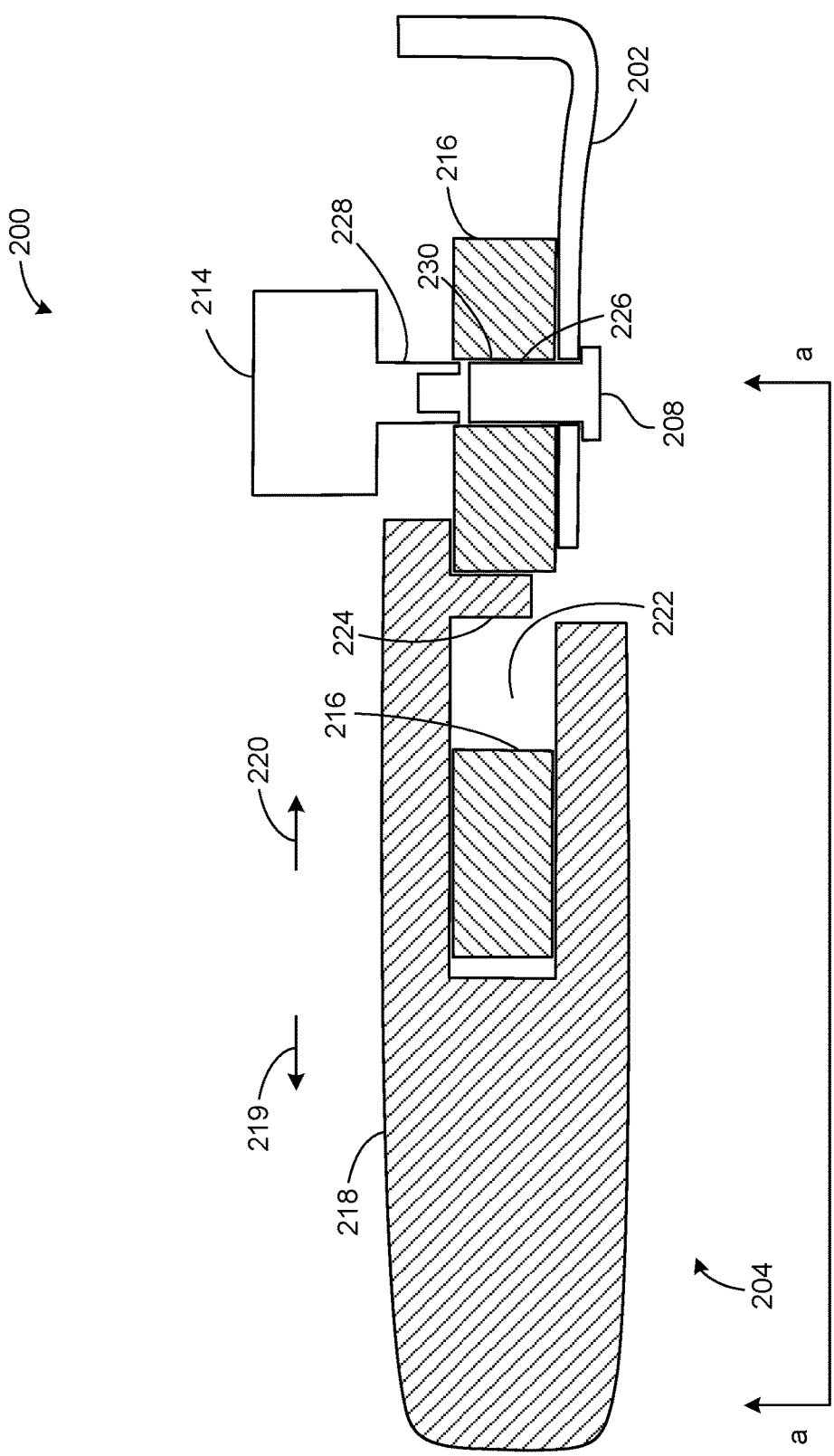
FIG. 2G illustrates a cross-sectional top-view of the example brake apparatus of FIGS. 2A, 2B, 2C, 2D, 2E and 2F.

FIG. 2G illustrates a cross-sectional top-view of the example brake apparatus 200 depicted in FIGS. 2A, 2B, 2C, 2D, 2E and 2F and shows the first portion 216 of the handle 204 coupled to the brake lever 202 and the second portion 218 coupled the first portion 216 to provide a grip for the driver. A recessed area or channel 222, disposed on the first portion 216 and extending partially along a length of the first portion 216, receives a protrusion or travel stop 224 of the second portion 218. The travel stop 224 and/or the second portion 216 can move in the first direction 219 and the second direction 220, opposite the first direction 219, relative to the first portion 216. In such examples, the travel stop 224 engages the first portion 216 to limit the relative movement. The hinge 208 is coupled to the first portion 216 and the brake lever 202 to enable the first portion 216, the second portion 218 and/or the handle 204 to rotate to different positions relative to the brake lever 202. In this example, the hinge 208 includes a shaft or pin 226 that extends axially through the brake lever 202 and the first portion 216 of the handle 204. The pin 226 may define a circumferential surface to engage the handle 204 and/or the brake lever 202 to enable the handle 204 to rotate to the different positions relative to the brake lever 202.

In the illustrated example of FIG. 2G, the lock 214 is operationally interposed between the handle 204 and the brake lever 202. The lock 214 enables the handle 204 to pivotably and/or rotatably lock and/or unlock relative to the brake lever 202 when the handle 204 is in the above-described different positions. For example, the lock 214 can couple to the hinge 208, the first portion 216 of the handle 204 and the brake lever 202 to support or resist a certain magnitude of force or torque (e.g., 5 foot-pounds, 10 foot-pounds, etc.) transmitted and/or applied to the handle 204 (e.g., by the driver), which can actuate the brake lever 202 to provide braking to the vehicle. In this example, the lock 214 is adjacent to the pin 226 and coupled to the first portion 216 of the handle 204. The lock 214 includes a locking protrusion 228, extending towards the first portion 216 of the handle 204 and/or the pin 226, adjacent to an aperture 230 of the first portion 216. The aperture 230 is disposed on the first portion 216 of the handle 204, adjacent to the hinge 208, and sized to receive the locking protrusion 228. In some such examples, the locking protrusion 228 has a shape (e.g., square, etc.) complimentary to a shape of the aperture 230 to engage a wall within the aperture 230 when the aperture 230 receives the locking protrusion 228, which can prevent rotation of the handle 204. In such examples, a number of the different positions of the handle 204 depends on geometric parameters of the shape. For example, when the shape includes a square, the handle 204 can rotate to provide a rotation angle having a smallest value near 90 degrees when rotating between the positions. In other examples, the shape can include other regular (or irregular) polygons having a different number of sides, such as a pentagon, a hexagon, an octagon, etc., to provide different rotation angles of the handle 204 (e.g., 72 degrees, 60 degrees, 45 degrees, etc.) when rotating between the different positions, which is explained in greater detail below in connection with FIG. 2H.

The lock 214 can lock and/or unlock the handle 204 based on user input or manipulation to the handle 204, the hinge 208 and/or the lock 214. In some examples, the locking protrusion 228 of the lock 214 can move toward and/or away from the aperture 230 in response to direct contact applied to the lock 214 and/or the hinge 208. For example, the driver may directly contact (e.g., via pushing and/or pulling) the lock 214 and/or the hinge 208 to move the locking protrusion 228 away from the first portion 216 and out of the aperture 230 to unlock the handle 204 by decoupling the lock 214 from the first portion 216. Conversely, the driver can push the lock 214 to cause the locking protrusion 228 to move towards the first portion 216 and into the aperture 230 to lock the handle 204 by coupling the lock 214 to the first portion 216. In other examples, the first portion 216 and/or the second portion 218 of the handle 204 can control the lock 214 when the second portion 218 moves relative to the first portion 216 between the above-described unlocked state and the locked state of the handle 204. In some such examples, the locking protrusion 228 can move away from and/or out of the aperture 230 to unlock the handle 204 in response to the second portion 218 moving relative to the first portion 216 in the first direction 219 to the unlocked state. Conversely, the locking protrusion 228 can move towards and/or into the aperture 230 to enable the locking protrusion 228 to couple to the first portion 216 in response to the second portion 218 moving relative to the first portion 216 in the second direction 220, opposite the first direction 219, to the locked state. In some such examples, a spring may be disposed (e.g., within the channel 222) between the first portion 216 and the second portion 218 to urge the first portion 216 away from and/or toward the second portion 218, which can facilitate the locking of the handle 204.

Figure 2H:
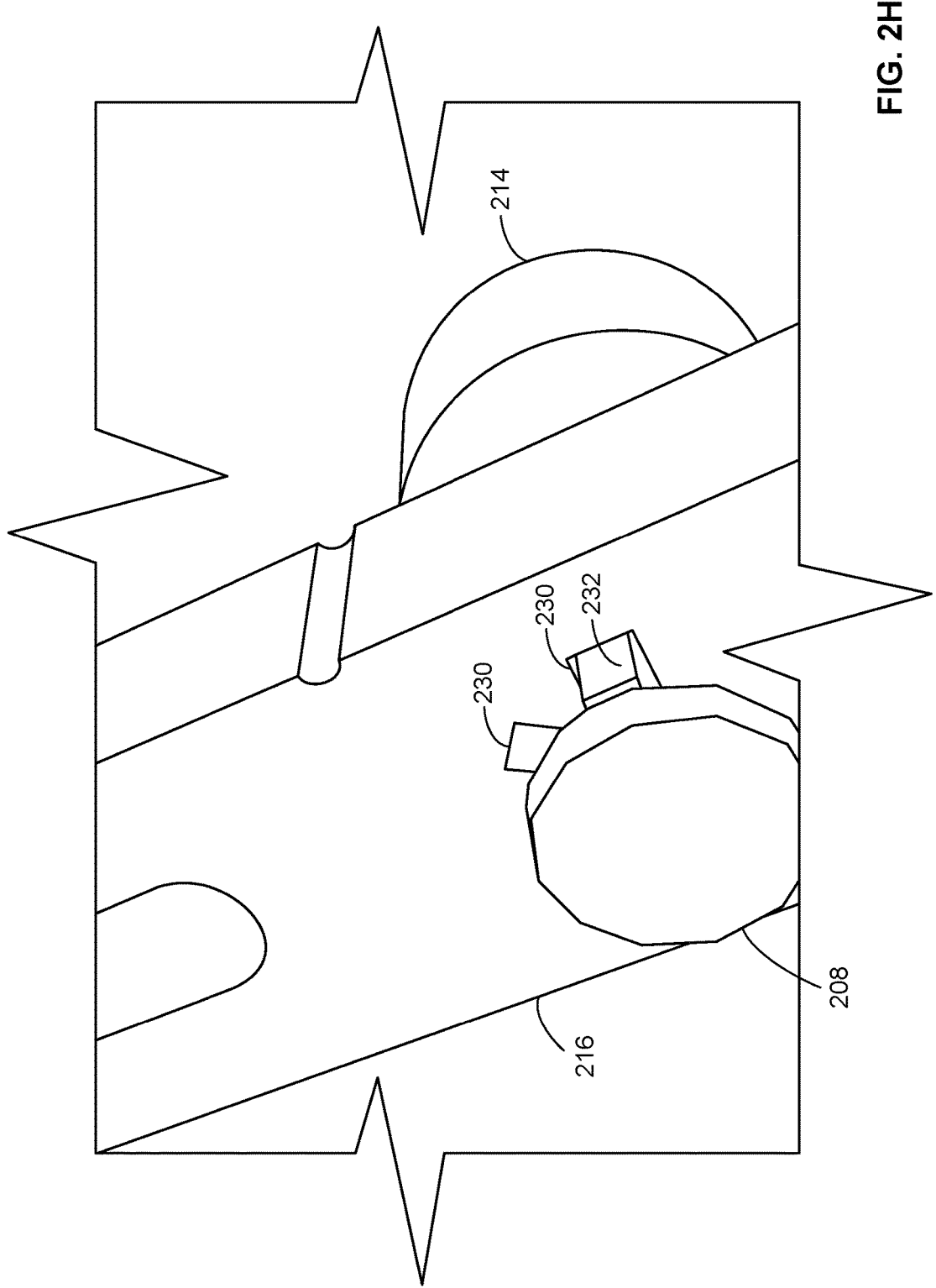
FIG. 2H illustrates a detailed portion view of the example brake apparatus of FIGS. 2A, 2B, 2C, 2D, 2E and 2F.

FIG. 2H illustrates a detailed portion view of the lock 214, the hinge 208 and the first portion 216 of the handle 204 (not shown) depicted in FIG. 2G. In some such examples, the hinge 208 includes an additional locking protrusion 232 having a shape that is complimentary to the shape of the aperture 230. In this example, the shape of the locking protrusion 232 and the shape of the aperture 230 are rectangular. Additionally or alternatively, in this example, the aperture 230 of the first portion 216 includes two rectangular shapes. In this example, the rectangular shapes are rotationally offset relative to each other to provide one or more of the above described positions of the handle 204 (e.g., the first position, the second position, etc.). In this example, the aperture 230 can receive the locking protrusion 232 of the hinge 208 when the handle 204 is in the locked state. When the handle 204 is in the unlocked state, the locking protrusion 232 moves out of the aperture 230 to enable the handle 204 to rotate between the first position and the second position and to enable the locking protrusion 228 to align with either of the rectangular shapes of the aperture 230. In other examples, the aperture 230 includes additional (e.g., 3, 4, 5, etc.) rectangular shapes that are rotationally offset relative to each other to provide and/or facilitate other positions of the handle 204.

FIGS. 3A, 3B and 3C illustrate other positions of another example brake apparatus 300 that may be used to implement the brake apparatus 100 of FIG. 1 in accordance with the teachings of this disclosure. The example brake apparatus 300 includes a brake lever (e.g., an electric parking brake lever) 302 operatively coupled to a vehicle (e.g., the vehicle 104) to provide braking. A handle 304 is operatively coupled to the brake lever 302 to rotate to different positions relative to the brake lever 302. In the illustrated example of FIGS. 3A, 3B and 3C, the vehicle can operate in different driving modes, as described above. In some such examples, the brake lever 302 can provide braking to the vehicle based on the brake lever 302 moving from a resting position (represented by the dotted/dashed lines) to an engaged position. In some examples, based on the different driving modes, the brake lever 302 ceases to provide braking to the vehicle after moving to different locations in a certain order or sequence.

In a first driving mode of the vehicle, as illustrated in FIGS. 3A and 3B, the brake lever 302 provides braking to the vehicle after moving in a first direction (represented by the arrow) from a resting position (represented by the dotted/dashed lines) to an engaged position (FIG. 3A). In this example, after the brake lever 302 returns to the resting position, the brake lever 302 continues to provide braking to the vehicle. Continuing with this example, the brake lever 302 ceases to provide to braking to the vehicle after moving in a second direction, opposite the first direction, from the resting position (represented by the dotted/dashed lines) to a disengaged position (FIG. 3B). In this example, after the brake lever 302 is moved to the disengaged position to discontinue braking of the vehicle, the brake lever 302 may return to the resting position.

In a second driving mode of the vehicle, as illustrated in FIG. 3C, the handle 304 extends above the brake lever to define an angled position (e.g., the above-described second position) of the handle 304 relative to the brake lever 302. In this example, the brake lever 302 provides braking to the vehicle after moving in a direction (represented by the arrow) from a resting position and/or a disengaged position (represented by the dotted/dashed lines) to an engaged position. In this example, after the brake lever 302 returns to the resting position and/or the disengaged position, the brake lever 302 ceases to provide braking to the vehicle.

In some examples, the orientation of the handle 304 relative to the brake lever 302 (e.g., whether in the first position (FIGS. 3A and 3B) or the second position (FIG. 3C)) operates independent of the driving mode. That is, in some examples, the handle 304 may be in the second position (as shown in FIG. 3C) while the vehicle is operating in the first driving mode (as described above in relation to FIGS. 3A and 3B). Likewise, in some examples, the handle 304 may be in the first position (as shown in FIGS. 3A and 3B) while the vehicle is operating in the second driving mode (as described above in relation to FIG. 3B). In other examples, the position of the handle 304 is associated with the driving mode of the vehicle. That is, in some examples, when the handle 304 is moved to the second position (FIG. 3C), the vehicle is automatically switched to the second driving mode. Similarly, when the handle 304 is in the first position (FIGS. 3A and 3B), the vehicle is in the first driving mode.

From the foregoing, it will be appreciated that the above disclosed systems and apparatus provide a handle operatively coupled to a brake lever of a vehicle to control braking of the vehicle. Examples disclosed herein enable the handle to rotate and/or pivot to different positions relative to the brake lever to define different angles relative to a vertical axis or position. Examples disclosed herein enable the handle to rotatably and/or pivotably lock in the different positions to receive an actuation force for the brake lever. Some disclosed examples provide a first portion of the handle coupled to a second portion of the handle. In such examples, the first portion can move relative to the second portion to rotatably and/or pivotably lock and/or unlock the handle. In some disclosed examples, the handle locks in a first position that extends substantially vertically away from the brake lever and/or locks in a second position that extends substantially horizontally away from the brake lever. Additionally or alternatively, examples disclosed herein detect or determine user selections relating to different driving modes of the vehicle. In some disclosed examples, the driver may select a first driving mode or a second driving mode of the vehicle during operations or maneuvers of the vehicle.

Although certain example systems and apparatus have been disclosed herein, the scope of coverage of this patent is not limited thereto. On the contrary, this patent covers all systems and apparatus fairly falling within the scope of the claims of this patent.

What is claimed is:

1. An apparatus comprising:
   a brake lever of a vehicle;
   a handle rotatably coupled to the brake lever to enable actuation of the brake lever via the handle in either a first position or a second position; and
   a sensor to detect selection of either (1) a first driving mode used when the handle is locked in the first position or (2) a second driving mode used when the handle is locked in the second position.

2. The apparatus of claim 1, wherein the handle includes an elongate axis that extends along a length of the handle, the elongate axis to be positioned within 45 degrees relative to a horizontal axis when the handle is in the first position.

3. The apparatus of claim 2, wherein the elongate axis is positioned within 45 degrees relative to a vertical axis when the handle is in the second position.

4. The apparatus of claim 1, further including a center console of the vehicle having a surface and defining a recess extending into the surface, the handle disposed within the recess when in the first position, the handle to extend above the surface outside of the recess when in the second position.

5. The apparatus of claim 1, wherein the handle includes a first portion coupled to the brake lever and a second portion coupled to the first portion, the first portion to move relative to the second portion to lock or unlock the handle in the first position and the second position.

6. The apparatus of claim 1, wherein the sensor is operatively coupled to at least one of the brake lever or the handle, the sensor to detect the selection based on the handle rotating to the first position or the second position.

7. The apparatus of claim 1, wherein the sensor includes a button disposed on at least one of the handle or the brake lever, the sensor to detect the selection in response to the button being pressed.

8. An apparatus comprising:
   a brake lever of a vehicle pivotable between an engaged position and a disengaged position;
   a handle coupled to the brake lever via a hinge, the handle to pivot relative to the brake lever between a first position and a second position, the brake lever to pivot between the disengaged position and the engaged position in response to an actuation force on the handle when locked in the first or second positions; and
   means for detecting selection of first or second driving modes of the vehicle, the handle locked in the first position when the vehicle is in the first driving mode, the handle locked in the second position when the vehicle is in the second driving mode.

9. The apparatus of claim 8, wherein the handle extends substantially horizontally away from an end of the brake lever when the handle is in the first position and the brake lever is in the disengaged position.

10. The apparatus of claim 8, wherein the handle includes a first portion coupled to the hinge and a second portion coupled to the first portion, the first portion to move relative to the second portion along an axis of the handle to pivotably lock or unlock the handle.

11. The apparatus of claim 8, wherein the handle is angled relative to the brake lever when in the second position to extend above the brake lever, the handle to extend substantially vertically away from an end of the brake lever when in the first position and the brake lever is in the engaged position.

12. The apparatus of claim 8, further including a center console of the vehicle defining a surface adjacent to the handle, wherein the handle and the brake lever are below the surface when the handle is in the first position and the brake lever is in the disengaged position, the handle to extend above the surface while the brake lever is below the surface when the handle is in the second position and the brake lever is in the disengaged position.

13. The apparatus of claim 8, wherein the selection is based on a rotational position of the handle relative to the brake lever.

14. The apparatus of claim 8, wherein the selection is based on direct contact to the means for detecting.

15. The apparatus of claim 8, wherein the means for detecting is operatively coupled to at least one of the handle or the brake lever.

16. An apparatus comprising:
   a brake lever for a vehicle;
   a handle coupled to the brake lever, the handle to rotate to different positions relative to the brake lever and a vertical axis, the handle to receive a force to actuate the brake lever when in the different positions;
   means for locking the handle in the different positions; and
   means for detecting selection of one of different driving modes, the selected driving mode implemented when the handle is in a respective one of the different positions.

17. The apparatus of claim 16, wherein the handle rotates between a first position and a second position of the different positions, the first position being within 90 degrees of the second position.

18. The apparatus of claim 17, wherein the handle extends substantially horizontally away from an end of the brake lever when in the first position, the handle in the first position being lower than the handle in the second position.

* * * * *